United States Patent
Ren et al.

(10) Patent No.: US 11,425,307 B2
(45) Date of Patent: Aug. 23, 2022

(54) IMAGE CAPTURE DEVICE IN WHICH THE FOCAL LENGTH OF THE IMAGE CAPTURE DEVICE CAN BE EXPANDED WITHOUT INCREASING THE SIZE OF LENSES

(71) Applicant: Hangzhou Hikvision Digital Technology Co., Ltd., Hangzhou (CN)

(72) Inventors: Jian Ren, Hangzhou (CN); Qi Gong, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 16 days.

(21) Appl. No.: 17/261,434

(22) PCT Filed: Jul. 19, 2019

(86) PCT No.: PCT/CN2019/096881
§ 371 (c)(1),
(2) Date: Jan. 19, 2021

(87) PCT Pub. No.: WO2020/015754
PCT Pub. Date: Jan. 23, 2020

(65) Prior Publication Data
US 2021/0321040 A1    Oct. 14, 2021

(30) Foreign Application Priority Data

Jul. 19, 2018   (CN) .................. 201810798102.0
May 8, 2019   (CN) .................. 201910380893.X

(51) Int. Cl.
*H04N 5/232*   (2006.01)
*H04N 5/225*   (2006.01)

(52) U.S. Cl.
CPC ....... *H04N 5/23296* (2013.01); *H04N 5/2258* (2013.01); *H04N 5/23212* (2013.01)

(58) Field of Classification Search
CPC ............. H04N 5/23296; H04N 5/2258; H04N 5/23212; H04N 5/232
See application file for complete search history.

(56) References Cited

U.S. PATENT DOCUMENTS 6,804,460 B1   10/2004   Oshima et al.
7,729,602 B2 *   6/2010   Janson, Jr. ......... H04N 5/23267
                                                          348/262

(Continued)

FOREIGN PATENT DOCUMENTS

CN   101902572   12/2010
CN   103458170   12/2013

(Continued)

OTHER PUBLICATIONS

International Search Report and Written Opinion issued in Corresponding PCT Application No. PCT/CN2019/096881, dated Oct. 23, 2019 (English Translation provided).

(Continued)

*Primary Examiner* — Luong T Nguyen
(74) *Attorney, Agent, or Firm* — Norton Rose Fulbright US LLP

(57) ABSTRACT

An image capture method and an image capture device are disclosed. The device includes a first chip, zoom lenses, image sensors, zoom motors, and focus motors. The number of the first chip is one; and the number of the zoom lenses are two, comprising a first short zoom lens and a second long zoom lens, wherein the two zoom lenses have different zoom ranges, and there is an overlap range between the zoom ranges of the two zoom lenses. The number of the image sensors is two, and the two image sensors correspond to the two zoom lenses respectively, and the two image sensors are communicatively connected to the first chip respectively. The number of the zoom motors is two, the number of the (Continued)

focus motors is two, and the two zoom motors and the two focus motors are communicatively connected to the first chip respectively.

11 Claims, 5 Drawing Sheets

(56) References Cited

U.S. PATENT DOCUMENTS

| | | | |
|---|---|---|---|
| 10,015,408 B2* | 7/2018 | Shabtay | H04N 5/23245 |
| 10,560,627 B2* | 2/2020 | Griffith | H04N 5/2253 |
| 2004/0179125 A1 | 9/2004 | Nagaoka | |
| 2006/0187338 A1 | 8/2006 | May et al. | |
| 2011/0012998 A1* | 1/2011 | Pan | H04N 13/246 |
| | | | 348/222.1 |
| 2014/0176767 A1 | 6/2014 | Hamel et al. | |
| 2016/0241793 A1 | 8/2016 | Ravirala et al. | |
| 2016/0379066 A1 | 12/2016 | Reiche et al. | |

FOREIGN PATENT DOCUMENTS

| | | |
|---|---|---|
| CN | 104363379 | 2/2015 |
| CN | 104967775 | 10/2015 |
| CN | 104980644 | 10/2015 |
| CN | 204721459 | 10/2015 |
| CN | 105308947 | 2/2016 |
| CN | 105959553 | 9/2016 |
| CN | 106454015 | 2/2017 |
| CN | 106506941 | 3/2017 |
| CN | 106791337 | 5/2017 |
| CN | 108076281 | 5/2018 |
| EP | 3346694 | 7/2018 |
| JP | 2005198155 | 7/2005 |

OTHER PUBLICATIONS

Extended European Search Report issued in Corresponding European Application No. 19838243.4, dated Jul. 20, 2021.
Office Action issued in Corresponding Chinese Application No. 201910380893.X, dated Mar. 24, 2021 (English Translation provided).

* cited by examiner

IMAGE CAPTURE DEVICE IN WHICH THE FOCAL LENGTH OF THE IMAGE CAPTURE DEVICE CAN BE EXPANDED WITHOUT INCREASING THE SIZE OF LENSES

CROSS REFERENCE TO RELATED APPLICATIONS

The present application is a national phase application under 35 U.S.C. § 371 of International Application No. PCT/CN2019/096881, filed Jul. 19, 2019, which claims the benefit of priority to Chinese patent application No. 201810798102.0 filed with China National Intellectual Property Administration on Jul. 19, 2018, and entitled "IMAGE CAPTURE METHOD AND IMAGE CAPTURE DEVICE", and Chinese patent application No. 201910380893.X filed with China National Intellectual Property Administration on May 8, 2019, and entitled "Camera Image Processing Method and Camera", each of which are incorporated herein by reference in their entirety.

TECHNICAL FIELD

This application relates to the technical field of video surveillance, and in particular to an image capture method and an image capture device.

BACKGROUND

With the development of computer, network and image processing technology, video surveillance technology has been widely used. There are diverse image capture requirements for video surveillance, such as panoramic image capture and close-up capture of key targets. Therefore, in order to meet diverse image capture requirements, image capture device for video surveillance are often required for a wide focal length range.

In related technologies, methods such as increasing the length of the lens in an image capture device or the number of optical lenses in the lens are usually adopted to achieve the purpose of expanding the focal length range of an image capture device. However, the above method has the problems of extremely high hardware cost, very large size of lens, and low yield rate of lenses with large size.

SUMMARY

The present application is intended to provide an image capture method and an image capture device, which are used to achieve the purpose of expanding the focal length range of an image capture device without increasing the size of lenses. The specific technical solution is as follows:

In a first aspect, the present application provides an image capture device, which includes:

a first chip, zoom lenses, image sensors, zoom motors, and focus motors;

wherein the number of the first chip is one;

the number of the zoom lenses are two, which comprises a first short zoom lens and a second long zoom lens; the two zoom lenses have different zoom ranges, and there is an overlap range between the zoom ranges of the two zoom lenses;

the number of the image sensors is two, and the two image sensors correspond to the two zoom lenses respectively, and the two image sensors are communicatively connected to the first chip respectively;

the number of the zoom motors is two, the number of the focus motors is two, and the two zoom motors and the two focus motors are communicatively connected to the first chip respectively; wherein one of the two zoom motor is connected to the first short zoom lens, and the other one of the two zoom motors is connected to the second long zoom lens; and one of the two focus motors is connected to the first short zoom lens, and the other one of the two focus motors is connected to the second long zoom lens; and the first chip is configured for, upon detecting that a current focal length of the first short zoom lens is equal to a preset switching focal length value, controlling an image sensor corresponding to the second long zoom lens to generate real-time images, and controlling an image sensor corresponding to the first short zoom lens to stop generating real-time images; wherein the preset switching focal length value is within the overlap range.

In the solution provided by the embodiments of the present application, the image capture device includes two zoom lenses, each lens has a different zoom range, and there is an overlap range between the two zoom ranges. Thus, by using the superposition of the zoom ranges of the two zoom lenses, the focal length range of an image capture device can be expanded without increasing the size of a single lens.

BRIEF DESCRIPTION OF THE DRAWINGS

In order to explain the embodiments of the present application and the technical scheme of the prior art more clearly, the drawings used in the prior art and the embodiments will be described briefly in the following, and it is apparent that the drawings in the description below are only some embodiments of the present application and those skilled in the art can obtain other drawings according to these drawings without inventive efforts.

DETAILED DESCRIPTION OF THE INVENTION

In order to enable those skilled in the art to better understand the technical solution in the present application, the technical solutions according to the embodiments of the present application will be described clearly and completely in the following with reference to the appended drawings in the embodiments of the present application. Obviously, the described embodiments are only some, and not all, of the embodiments of the present application. All other embodiments obtained based on the embodiments of the present application by those skilled in the art without any creative efforts fall into the scope of protection defined by the present application.

Firstly, the terminology in the embodiments of the present application embodiment will be explained.

Magnification splicing: it typically means that a single lens cannot achieve both short focal length and long focal length. By using dual-lens or multi-lens splicing technology, the videos from a short focal lens and a long focal lens are spliced to achieve the purpose of expanding the focal length of an image capture device.

In order to achieve the purpose of expanding the focal length range of an image capture device without increasing the size of a single lens, the embodiments of the present application embodiment provides an image capture method and an image capture device.

The execution subject of the image capture method can be an image capture device including a first chip, 2 zoom lenses, zoom motors and focus motors for each lens and other components. For ease of understanding, the image capture device is introduced below.

Figure 1:
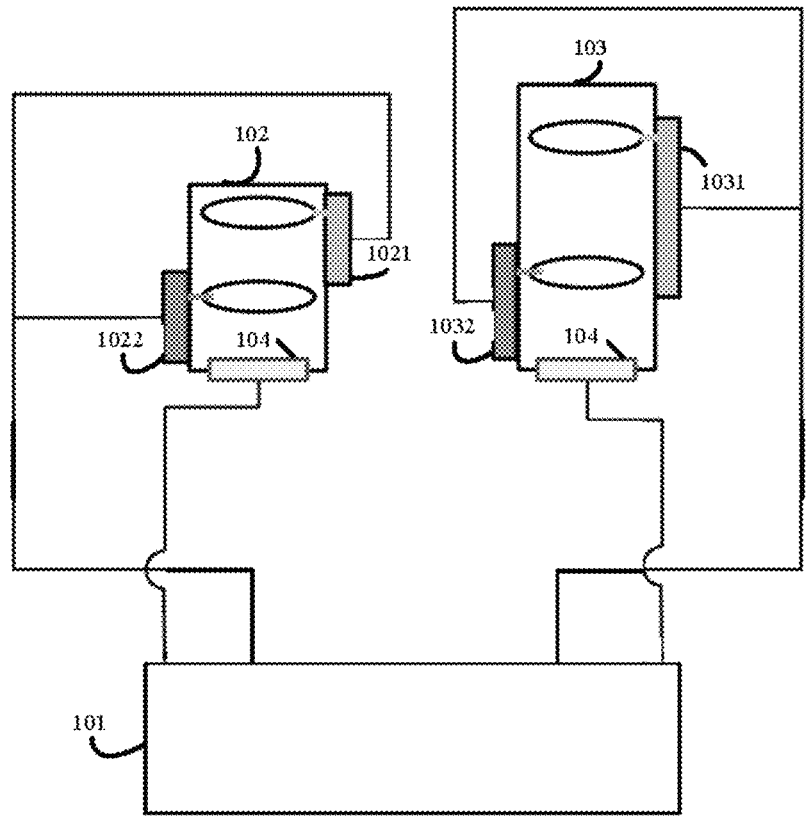
FIG. 1 is a schematic structural diagram of an image capture device according to an embodiment of the present application.

As shown in FIG. 1, the image capture device according to an embodiment of the present application may include: a first chip 101, a first short zoom lens 102, a second long zoom lens 103, zoom motor 1021, zoom motor 1031, focus motor 1022, focus motor 1032 and image sensors 104.

Among them, the number of the first chip 101 is 1. As the control center of the image capture device, the first chip is communicatively connected to the various components in the device and controls the various components in the device by using communication information. Of course, the communication connection between the first chip 101 and the various components in the device can be realized by means of the communication interfaces and the communication buses.

Figure 2:
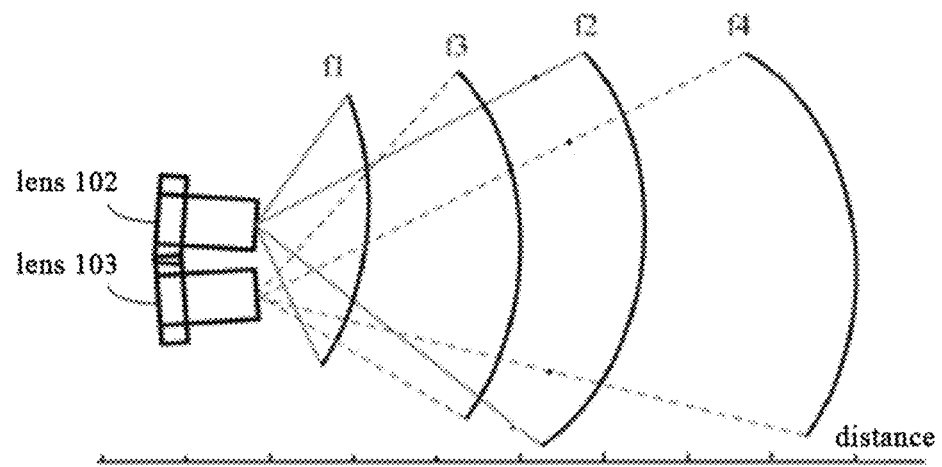
FIG. 2 is a schematic diagram of the zoom ranges of two lenses in the image capture device according to an embodiment of the present application.

The number of zoom lens is 2, including a first short zoom lens 102 and a second long zoom lens 103; the two zoom lenses have different zoom ranges, and there is an overlap range between the zoom ranges of the two zoom lenses. For ease of understanding, as shown in FIG. 2, the dual-lens zoom range in the image capture device of this embodiment can be: the zoom range of the first short zoom lens 102 is [f1,f2], and the zoom range of the second long zoom lens 103 is [f3,f4], with f1<f3<f2<f4, an overlap range [f3, f2] existing.

The number of image sensors 104 is 2. Among them, one image sensor 104 corresponds to the first short zoom lens 102, which is used to obtain the images captured by the first short zoom lens 102 under the control of zoom motor 1021 and focus motor 1022 after focusing and zooming; and the other image sensor 104 corresponds to the second long zoom lens 103, which is used to obtain the images captured by the second long zoom lens 103 under the control of zoom motor 1031 and focus motor 1032 after focusing and zooming; and the two image sensors are communicatively connected to the first chip 101, so as to send the obtained images to the first 101 chip.

The number of zoom motors is 2, wherein one zoom motor 1021 is connected to the first short zoom lens 102, which is used to control the zooming of the first short zoom lens 102; and the other zoom motor 1031 is connected to the second long zoom lens 103, which is used to control the zooming of the second long zoom lens. The number of the focus motors 102 is 2, wherein one focus motor 1022 is connected to the first short zoom lens 102, which is used to control the focusing of the first short zoom lens 102; and the other focus motor 1032 is connected to the second long zoom lens 103, which is used to control the focusing of the second long zoom lens 103.

The first chip 101 is configured for, upon detecting that the current focal length of the first short zoom lens 101 is equal to a preset switching focal length value, controlling the image sensor 104 corresponding to the second long zoom lens 103 to generate real-time images, and controlling the image sensor 104 corresponding to the first short zoom lens 102 to stop generating real-time images.

Specifically, the zoom lenses can capture images within their own zoom ranges, but cannot capture images not within their own zoom ranges. Therefore, a preset switching focal length value within the overlap range can be preset to control the switching of the zoom lenses. Thus, within the expanded zoom range obtained by superimposing the respective zoom ranges of the first short zoom lens 102 and the second long zoom lens 103, when the current focal length of the first short zoom lens 102 is equal to the preset switching focal length value, the image capture device can be switched to the second long zoom lens 103 which is suitable for the current focal length to capture images. Correspondingly, since the zooming that matches the focal length range of the current focal length cannot be performed, the first short zoom lens 102 can be in a standby mode, which is specifically executed as follows: the first chip 101 instructs the zoom motor 1021 and the focus motor 1022 to control the first short zoom lens 102 to stop the first zooming and the first focusing, and control the image sensor 104 corresponding to the first short zoom lens 102 to stop generating real-time images.

Optionally, similarly to the above switching from the first short zoom lens 102 to the second long zoom lens 103, in the image capture device according to the embodiment of the present application shown in FIG. 1, the first chip 101 can be further configured for:

upon detecting that the focal length of the second long zoom lens 103 is equal to the preset switching focal length value, instructing the image sensor 104 corresponding to the first short zoom lens 102 to generate real-time images, and instructing the image sensor 104 corresponding to the second long zoom lens 103 to stop generating real-time images.

Of course, the case of detecting that the current focal length of the second long zoom lens 103 is equal to the preset switching focal length value is similar to the above embodiment of FIG. 1 in this application. The difference between the two is that the zoom lens suitable for the current focal length range is different. The lens used to capture images and the lens in standby mode are different ones.

The embodiment of the present application provides an image capture device, including two zoom lenses. Each zoom lens has a different zoom range, and there is an overlap range between the two zoom ranges. Thus, by using the superposition of the zoom ranges of the two zoom lenses, the focal length range of an image capture device can be expanded without increasing the size of a single lens.

In specific applications, the current focal length can be various. For example, the focal length can include: a focal length corresponding to the current magnification determined by the first chip 101 according to the current magnifications of each lens through the preset corresponding relationship between the magnification and the focal length. Or, for example, the current focal length can include: after the latest zooming, the focal length of the image capture device stored by the first chip 101.

On this basis, optionally, in the above embodiment of FIG. 1 of the present application, the first chip 101 detects that the current focal length of the first short zoom lens 102 is equal to a preset switching focal length value can specifically include:

obtaining a current magnification of the zoom motor 1201 corresponding to the first short zoom lens 102; determining the current focal length of the first short zoom lens 102 according to the current magnification of the zoom motor 1201 corresponding to the first short zoom lens 102 and by using a preset corresponding relationship between the magnification and the focal length; determining that whether the current focal length of the short zoom lens 102 is equal to the preset switching focal length value; if equal, detecting that the current focal length of the first short zoom lens 102 is equal to the preset switching focal length value.

In specific applications, since the images are captured by different lenses in different focal length range, the current focal length for each lens can be determined according to the current magnification of the camera's zoom motor and by using the preset corresponding relationship between the magnification and the focal length, which specifically can be: based on the current magnification of a specified lens and by using the preset corresponding relationship between the magnification and the focal length, determining the current magnification of the specified lens.

The specified lens may be any one of the lens with the smallest focal length range, the lens with the largest focal length range, or the lens with other focal length ranges. Among them, the preset corresponding relationship between the magnification and the focal length can be a corresponding relationship table between the magnification of the zoom motor and the focal length in the lens. The first chip can look up the corresponding focal length from the corresponding relationship table based on the magnification, or for the mapping relationship between the magnification of the zoom motor and the focal length in the lens, the first chip can use the mapping relationship to calculate the corresponding focal length based on the magnification of the zoom motor in the lens.

In the non-overlap range, optionally, in the image capture device of the embodiment of the present application shown in FIG. 1, the first chip 101 can further be configured for:

upon detecting that the current focal length of the first short zoom lens 102 is not within the overlap range and is within the zoom range of the first short zoom lens 102, controlling the image sensor 104 corresponding to the first short zoom lens 102 to generate real-time images, and controlling the image sensor 104 corresponding to the second long zoom lens 103 not to generate real-time images.

It can be understood that, in the non-overlap range, each lens can capture images in its respective zoom range. Therefore, when the first chip 101 detects that the current focal length of the first short zoom lens 102 is not within the overlapping range and is within the zoom range of the first short zoom lens 102, it controls the image sensor 104 corresponding to the first short zoom lens 102 to generate real-time images and controls the image sensor 104 corresponding to the second long zoom lens 103 not to generate real-time images.

Similarly, when the first chip 101 detects that the current focal length of the second long zoom lens 103 is not within the overlapping range and is within the zoom range of the second long zoom lens 103, it controls the image sensor 104 corresponding to the second long zoom lens 103 to generate real-time images, and control the image sensor 104 corresponding to the first short zoom lens 103 not to generate real-time images.

In specific applications, when there is lens switching during zooming, if the movement speeds of the zoom motors of the two lenses before and after the switching are inconsistent, the zooming process will not be smooth, and the picture will change quickly or slowly before and after the switching. Therefore, in order to achieve the effect of changing pictures uniformly before and after the switching, optionally, in the imaging device of the embodiment of the present application shown in FIG. 1, the first chip 101 is further configured for:

before controlling the image sensor 104 corresponding to the second long zoom lens 103 to generate real-time images and controlling the image sensor 104 corresponding to the first short zoom lens 102 to stop generating real-time images, based on the preset switching focal length, determining. a preset magnification corresponding to the first short zoom lens 102; based on the preset magnification corresponding to the first short zoom lens 102, a specified zoom speed, and an initial magnification of the first short zoom lens 102, determining an initial step size of the zoom motor 1021 of the first short zoom lens 102, and controlling the zoom motor 1021 of the first short zoom lens 102 operates to the initial step size; and after the zoom motor 1021 of the first short zoom lens 102 operates to the initial step size, controlling the zoom motor 1021 of the first short zoom lens 102 to perform a zoom operation according to the specified zoom speed.

Among them, the initial magnification can be the current magnification of the zoom motor 1021 of the first short zoom lens 102. The preset magnification is the magnification corresponding to the preset switching focal length, and it may be of various types. For example, the preset magnification can be pre-stored in the first chip 101 of the image capture device. Or, for example, the preset magnification can be determined in real time by the first chip 101 based on the preset switching focal length, using the corresponding relationship between the preset focal length and the magnification value. In addition, the initial step size of the zoom motor 1021 of the first short zoom lens 102 can be determined specifically based on the difference between the magnification corresponding to the preset switching focal length and the current magnification of the first short zoom lens 102, using corresponding relationship between the preset step size of the zoom motor and the magnification.

In specific applications, based on the difference between the magnification corresponding to the preset switching focal length and the current magnification of the first short zoom lens 102, by using the corresponding relationship between the preset step size of the zoom motor and the magnification, the initial step size of the zoom motor 1021 of the first short zoom lens 102 is determined, which may include: determining that whether there is a residual value after the difference between the magnification corresponding to the preset switching focal length and the current magnification of the first short zoom lens 102 is divided by the preset step size of the zoom motor; if there is a residual value, the residual value is determined as the initial step size of the zoom motor 1021 of the first short zoom lens 102. Since the video is transmitted in units of frames, the zoom motor in the image capture device also needs to move in units of frames. Based on this, in order to achieve the effect of changing images uniformly before and after lens switching, it is necessary to ensure that the movement speed of the zoom motor is the same during the time between the frame before switching and the frame after switching. However, the moving distance of the zoom motor during a frame will not be constant, changing with the current magnification, which will result in that though the zoom motor keeps moving at a constant speed during a frame, it may not be able to move to the switching position at the end of the frame, and thus it cannot carry out switching in units of frames. Therefore, in order to achieve the effect of changing images uniformly before and after lens switching, it is also necessary to ensure that the zoom motor moves to the switching position at the moment of lens switching.

For example, the magnification corresponding to the preset switching focal length is Q=2310, the specified magnification speed is P=25, and the current magnification of the zoom motor 1 of the first short zoom lens 1 is N=1800. In order to ensure that the lens is switched to the magnification corresponding to the preset switching focal length, the distance that the zoom motor of the first short zoom lens 1 needs to move is M=Q−N=510. If at this time the zoom motor 1 of the first short zoom lens 1 moves at a constant speed P to Q, the zoom motor 1 will move a distance of 500 and 525, reaching a magnification of 2300 and a magnification of 2315, but cannot be at the magnification Q=2310 corresponding to the preset switching focal length. Therefore, when starting to zoom, a certain start step K should be set, letting K=the remainder of M÷P, i.e. 510÷25=20 plus 10. The first chip sends a control instruction for a start step to the zoom motor of the first short zoom lens for controlling the zoom motor of the first short zoom lens, when it is started, to move 10 steps during the first frame, and during each frame after the first frame move at the specified zoom speed, so as to ensure that the zoom motor of the first short zoom lens just move to the magnification corresponding to the preset switching focal length. In addition, moving at the specified zoom speed during each frame after the first frame can ensure the speed of the zoom motor during the time between the frame before switching and the frame after switching is the same.

Considering that the first chip 101 also needs to encode and output the image signal sent by the image sensor 104, and the image coding will occupy a large amount of computing resources, which may cause the performance of the first chip 101 to decrease, and then the work efficiency of the image capture device to decrease.

Figure 3:
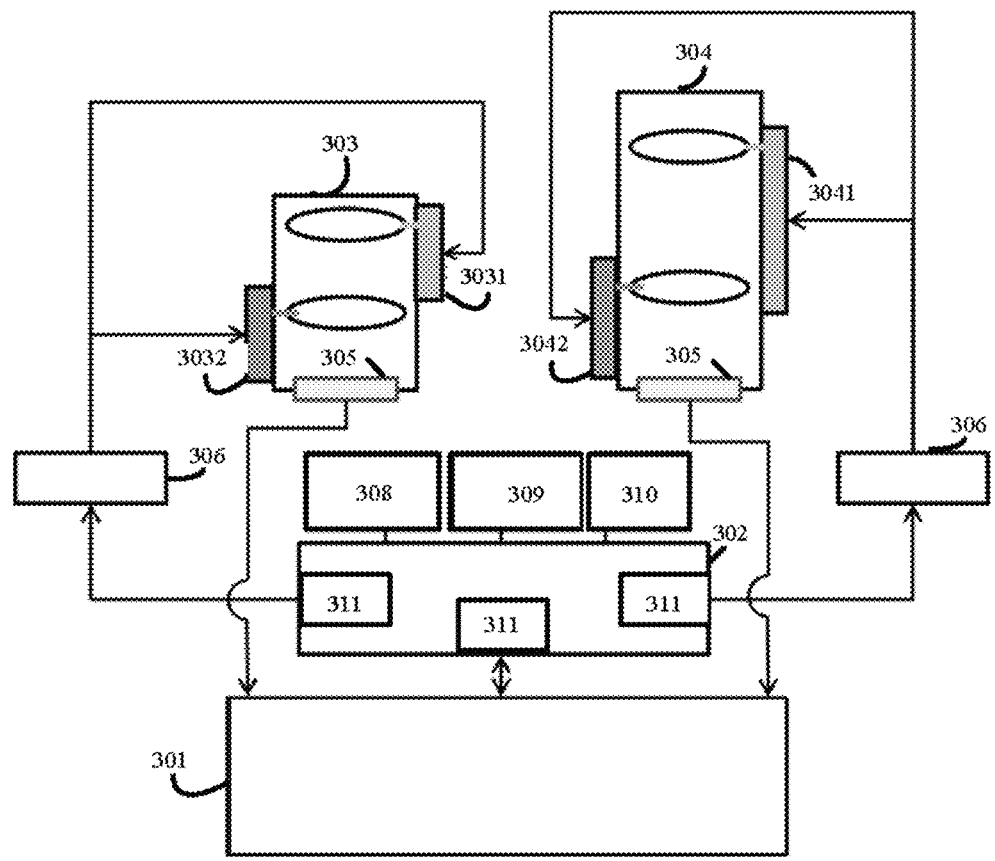
FIG. 3 is another schematic structural diagram of an image capture device according to an embodiment of the present application FIG. 4($a$) is a focus curve diagram of lens A in the image capture device according to another embodiment of the present application.

Therefore, in order to avoid the decrease in the work efficiency of image capture device, as shown in FIG. 3, the image capture device is provided by another embodiment of the present application, which can include: a first chip 301, a second chip 302, a first short zoom lens 303, a second long zoom lens 304, a zoom motor 3031, a zoom motor, 3041, a focus motor 3032, a focus motor 3042 as well as image sensors 305.

Of course, in specific applications, the image capture device can also include: drive chips 306 for driving the movement of each motor, an aperture communication interface 308 for communication connection, a dual-filter switcher communication interface 309, and a motor communication interface 310 and a communication bus interface 311.

Among them, the first chip 301, the first short zoom lens 303, the second long zoom lens 304, the zoom motor 3031, the zoom motor 3041, the focus motor 3032, the focus motor 3042, and the image sensors 305 are the same as shown in FIG. 1 of this application. In the example, the first chip 101, the first short zoom lens 102, the second long zoom lens 103, the zoom motor 1021, the zoom motor 1031, the focus motor 1022, the focus motor 1032 and the image sensor 104 in the embodiment of the present application shown in FIG. 1, which will can be referred to the description of the embodiment of FIG. 1 and not be repeated here.

One second chip 302 communicates with the first chip 301 by means of a serial peripheral interface bus, and the first chip 301 sends control instructions to the second chip 302. The second chip 302 controls the apertures of the two lenses and the actions of the dual-filter switcher respectively through the communication interface 308 and the dual-filter switcher communication interface 309 according to the received control instructions.

The two zoom motors and the two focus motors are respectively communicatively connected to the first chip 301 by means of the second chip 302. Specifically, the second chip 302 receives the signals of the zoom motor 3031, the zoom motor 3041, the focus motor 3032, and the focus motor 3042 of the two lenses through the motor communication interface 310. The second chip 302 sends instructions to the driving chips 306 to control the movements of the zoom motor 3031, the zoom motor 3041, the focus motor 3032, and the focus motor 3042 of the two lenses. The driving chips 306 are connected to the second chip 302 through the communication bus interface 311, sharing the communication bus interface 311 of the second chip 302, and the two groups of signals of the driving chips can be switched by means of a chip selecting signal.

In specific applications, during the image capturing process of the image capture device in the embodiment of the present application shown in FIG. 3, when the first short zoom lens has been zoomed and the subsequent focal length is being adjusted, the current focal length may change to fall within the overlap range, and at this time, the lens in the standby mode needs to participate in zooming. At this time, the focal length of the lens in the standby mode needs to be adjusted from the focal length in the standby state to the focal length required for participate in zooming, and a certain time delay will be experienced for the focal length adjustment, resulting in lens switching not timely and switching jams.

For this, in order to reduce the time delay experienced due to the focal length of the lens in the standby mode adjusted from the focal length in the standby state to the focal length required for participating in zooming and avoid the jams of lens switching, in the shown in FIG. 3, the application example of image capture device according to the embodiment of the present application shown in FIG. 3, the first chip 301 is specifically configured for:

upon detecting the current focal length of the first short zoom lens 303 is equal to the preset switching focal length, before controlling the image sensor 305 corresponding to the second long zoom lens 304 to generate real-time images, sending a control instruction to the second chip 302; and the second chip 302 is configured for: upon receiving the control instruction, controlling the zoom motor 3041 corresponding to the second long zoom lens 304 to perform a zoom operation, controlling the focus motor 3042 corresponding to the second long zoom lens to perform focusing operation and controlling the image sensor 305 corresponding to the second long zoom lens 304 not to generate real-time images.

Considering that when the current focal length of the first short zoom lens 303 is within the overlap range, the current focal length of the lens changes, as a function of the subsequent zoom parameter, to the preset switching focal length, and when the current focal length is equal to the preset switching focal length, the lens for capturing images will be switched to the second longest zoom lens 304. Therefore, when the current focal length of the first short zoom lens 303 is within the overlap range, the zoom motor 3041 and the focus motor 3042 corresponding to the second long zoom lens 304 can be controlled to perform zoom operation and focus operation respectively, so that the second long zoom lens 304 follows the movement of the first short zoom lens 303. When the current focal length is equal to the preset switching focal length, the second long zoom lens 304 is moved as far as possible to the position where the distance away from the focal length required for participating in zooming is less or zero, thereby reducing time delay experienced due to the focal length adjusted from the focal length of the second long zoom lens 304 in the standby mode to the focal length required for participating in zooming.

Of course, during the process of the second long zoom lens 304 following the movement of the first short zoom lens 303, since the current focal length has not reached the preset switching focal length, the lens used to obtain images is still the first short zoom lens 303, and correspondingly, the first chip 301 controls the image sensor 305 corresponding to the second long zoom lens 304 not to generate real-time images.

Optionally, upon the above first chip 301 detects that the current focal length of the first short zoom lens is within the overlap range, it sends control instructions to the second chip, which can specifically include:

upon detecting that the current focal length of the first short zoom lens 302 is within the overlap range, obtaining a current object distance corresponding to the current focal length, and based on the current object distance and the current focal length, determining a first magnification and a first focal length of the second long zoom lens 304, and sending a control instruction including the first magnification and the first focal length to the second chip 302; and correspondingly, the above second chip 302, upon receiving the control instruction, controls the zoom motor 3041 corresponding to the second long zoom lens 304 to perform the zoom operation, controls the focus motor 3042 corresponding to the second long zoom lens to perform the focusing operation, and controls the image sensor 305 corresponding to the second long zoom lens 304 not to generate real-time images, which can specifically includes:

the second chip 302, upon receiving the control instruction including the first magnification and the first focal length, controls the zoom motor 3041 corresponding to the second long zoom lens 304 to perform the zoom operation according to the first magnification, controls the focus motor 3042 corresponding to the second long zoom lens 304 to performs the focusing operation according to the first focal length, and controls the image sensor 305 corresponding to the second long zoom lens 304 not to generate real-time images.

The second chip 302, upon receiving the control instruction including the first magnification and the first focal length, controls the zoom motor 3041 corresponding to the second long zoom lens 304 to perform the zoom operation according to the first magnification and controls the focus motor 3042 corresponding to the second long zoom lens 304 to performs the focusing operation according to the first focal length specifically can be various. For example, the second chip 302 can send the first magnification of the second long zoom lens 304 to the zoom motor 3041 of the second long zoom lens 304, so that the second long zoom lens 304 can move based on the first magnification and thus the second long zoom lens 304 follows the first short zoom lens 303 to zoom. Or, for example, the second chip 302 can determine the control signal for movement of the zoom motor 3041 of the second long zoom lens 304 based on the first magnification of the second long zoom lens 304, and send the control signal for movement to the zoom motor 3041 of the second long zoom lens 304 to control the zoom motor 3041 of the lens 304 to move in accordance with the control signal for movement, thereby achieving the second long zoom lens 304 following the first short zoom lens 303 to zoom. Similar to the specific process of controlling the zoom motor 3041 of the second long zoom lens 304 to move according to the first magnification, the second chip 302 controls the focus motor 3042 of the second long zoom lens 304 to move according to the first focal length. The difference between the two is that motors in control and the information used for control are different.

Optionally, in the above embodiment, the first chip 302 obtains a current object distance corresponding to the current focal length, and based on the current object distance and the current focal length, determines a first magnification and a first focal length of the second long zoom lens, specifically can includes:

determining the current object distance based on the current magnification and the current focal length corresponding to the first short zoom lens 303;

based on the current object distance and the current magnification corresponding to the first short zoom lens 303, search for first preset magnification curves and determining a first magnification corresponding to the second long zoom lens; wherein the first preset curve comprises at least one magnification curve, any magnification curve is used to indicate the corresponding relationship between the magnification of the first short zoom lens and the magnification of the second long zoom lens at one preset object distance, and different magnification curves correspond to different preset object distances; and based on the first magnification corresponding to the second long zoom lens 304, searching for focus curves corresponding to the second long zoom lens 304 and determining a first focal length corresponding to the second long zoom lens 304, wherein the focus curves comprises at least one focus curve, any focus curve is used to indicate the corresponding relationship between the magnification of the second long zoom lens and the focal length of the second long zoom lens at one preset object distance, and different focus curves correspond to different preset object distances.

For different object distances, focus curves of each lens at that object distance will be generated, so that multiple focus curves at different object distances can be stored in the first chip 301 in advance. Correspondingly, the first chip 301 can directly determine the current focus curve at the current object distance of the scene from the multiple focus curves stored according to the current magnification and the current focal length of the first short zoom lens 302, so as to determine, based on the current focus curves, the current object distance of the scene where the image capture device is located.

On this basis, the magnification curve can be obtained from multiple preset magnification curves according to the current object distance; wherein, the multiple preset magnification curves are those curves respectively at multiple preset object distances and established according to the corresponding relationship between the magnification the first short zoom lens 302 and the magnification of the second long zoom lens 304. Thus, the first magnification of the second long zoom lens 304 can be determined according to the magnification curve and the first magnification of the first short zoom lens 302. At the same time, the first chip 301 can determine the first focal length of the second long zoom lens 304 according to the first magnification of the second long zoom lens 304 by using the relationship between the focal length and the magnification.

In specific applications, the above image capture device may further include knobs for adjusting the zoom motors, so that the user can adjust the zoom motors by rotating the knobs, thereby adjusting the focal lengths of the lenses. In addition, the first chip can also receive the zoom parameters generated by the user's operation fed back by the zoom motors, and then send control instructions according to the zoom parameters and the pre-stored image capture program to realize the functions of the image capture device that cannot be achieved by user's operation alone. Of course, user's operations can be not only by means of the knobs, but also by means of remote commands, control signals, etc.

Figure 4A:
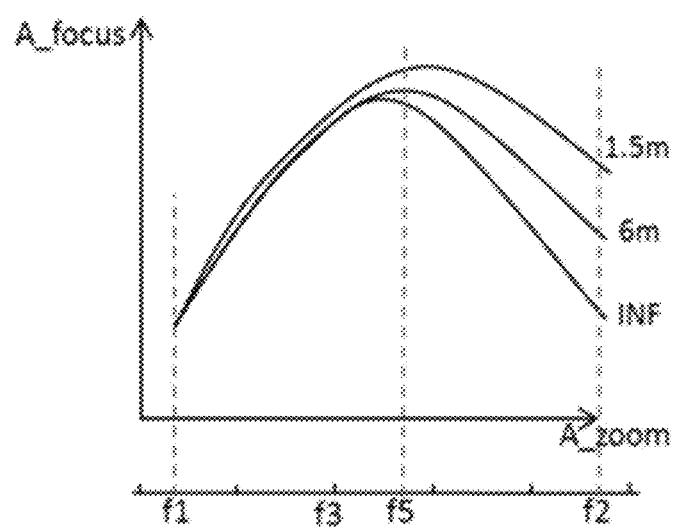
FIG. 4($b$) is a focus curve diagram of lens B in the image capture device according to another embodiment of the present application.
Figure 4B:
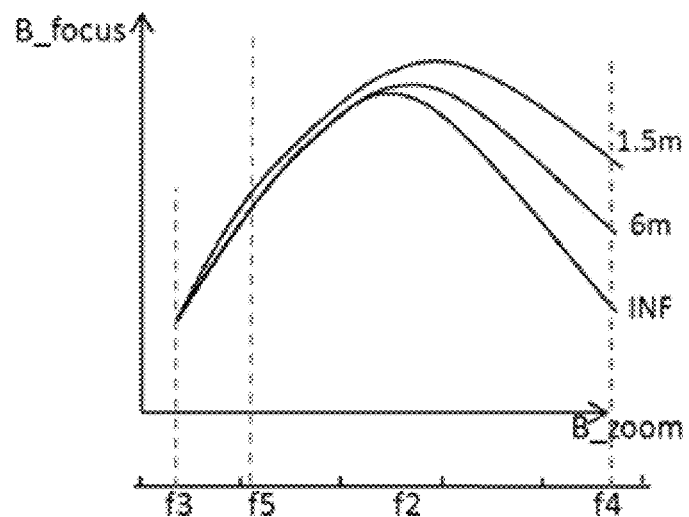
Figure 5:
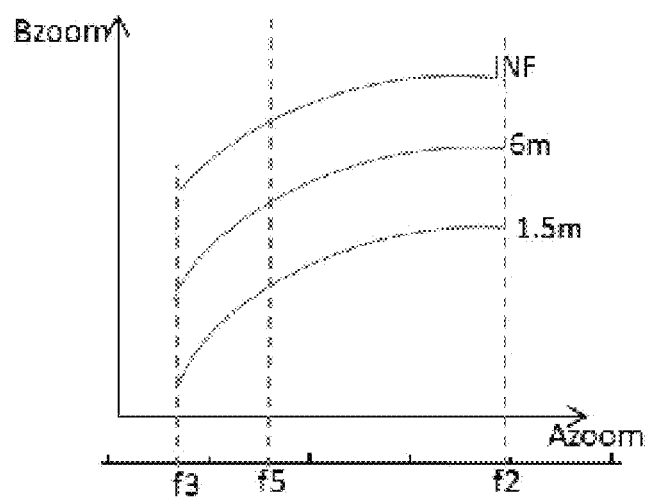
FIG. 5 is a magnification curve diagram used in the image capture device according to an embodiment of the present application.

For ease of understanding, two lenses: lens A and lens B are taken as examples for illustration. For example, the focus curve of lens A is as shown in FIG. 4(a), the focus curve of lens B is as shown in FIG. 4(b), and the magnification curve. is as shown in FIG. 5, Among them, in FIG. 4 (a), FIG. 4 (b) and FIG. 5, A_focus, B_focus represent the focal lengths of lens A and lens B, A_zoom, B_zoom respectively represent the magnifications of lens A and lens B, and the object distance corresponding to each curve is 1.5 m, 6 m and INF. Suppose lens A is the first short zoom lens, lens B is the second long zoom lens.

The first chip determines the current focus curve of lens A from the focus curves shown in FIG. 4(a) according to the current magnification of the zoom motor o and the current focal length of the focus motor of lens A, such as the curve corresponding to the object distance of 1.5 m. According to the current focus curve, it determines the current object distance of the scene where the image capture device is located is 1.5 m. According to the current object distance of 1.5 m, from the multiple preset magnification curves shown in FIG. 5, it obtains a magnification curve with an object distance of 1.5 m. according to the magnification curve corresponding to the object distance of 1.5 m and the current magnification of the zoom motor of lens A, it determines the current magnification of lens B.

Similar to the operation performed when lens A is the first short zoom lens, suppose the first short zoom lens is lens B, and the second long zoom lens is lens A. According to the corresponding relationship between the current magnification and the focal length of lens A, the current focus curve of lens A can be determined to be one of the focus curves shown in FIG. 4(b), such as the curve withe the object distance of 1.5 m. According to the current focus curve, the current object distance of the scene where the image capture device is located is determined as 1.5 m. According to the current object distance, from the multiple preset magnification curves shown in FIG. 5, the curve corresponding to the object distance of 1.5 m is obtained. According to the magnification curve corresponding to the object distance of 1.5 m and the current magnification of lens B, the current magnification of lens A is determined.

In the above method of the second long zoom lens following the first short zoom lens to zoom, the first chip can determine the current magnification of the lens based on the current magnification of the zoom motor and the current focal length of the focus motor of the first short zoom by using the preset magnification curve, and control the zoom motors of the second long zoom lens according to the current magnification of the second long zoom lens, thereby realizing the effect of the second long zoom lens following the first short zoom lens to zoom. Compared with the case that the zooming of the first short zoom lens is zooming while the second long zoom lens is in the standby mode, during the lens switching, there will be no time delay when the second long zoom lens starts from the standby mode to the zoom mode, thereby avoiding the jams of lens switching and unsmooth zooming.

Optionally, in the above optional embodiment, the preset magnification curve shown in FIG. 5 can be specifically established by using the following steps 1 to 3:

step 1: dividing the overlap range of the first short zoom lens and the second long zoom lens to obtain a preset number of sub-focal lengths.

Since the zoom following is a process in which the second long zoom lens follows the first short zoom lens in the overlapping range, and the zooming of the lens is caused by the movement of the zoom motor in the lens, in order to obtain the following relationship curve between the two lenses, the overlap range can be divided to obtain a preset number of sub-focal lengths, so as to adjust the zoom motors of the two lenses for each sub-focal length to simulate movement of the zoom motor of the lens in the overlap range.

step 2: for each sub-focal length, according to the sub-focal length, the preset object size, the preset object distance and the preset pixel width, using the preset imaging principle, determining the specified pixels of the image at the sub-focal length formed by an object with the preset object size at the preset object distance.

Since the second long zoom lens zooms follows the first short zoom lens to zoom, which is equivalent to making the focal lengths of the motors of the two lenses the same after zooming, a preset object can be set to determine that the specified pixels of the images formed at each sub-focal length when the preset object is at the preset object distance. Then, the determined specified pixels are used as the reference standard, which is used as the standard for the subsequent zooming of the first short zoom lens and the second long zoom lens. In specific applications, different preset object distances can be set multiple times to obtain the magnification curves in multiple application scenarios. Specifically, for each sub-focal length, the magnification of the first short zoom lens and the magnification of the second long zoom lens can be adjusted, and then the first magnification making the pixels of the image formed by the first short zoom lens equal to the specified pixels of the image formed at the sub-focal length, and the second magnification making the pixels of the image formed by the second long zoom lens equal to the specified pixels of the image formed at the sub-focal length is recorded.

step 3: establishing a preset magnification curve according to the first magnification and the second magnification corresponding to each sub-focal length.

In specific applications, there may be multiple ways to establish the preset magnification curve according to the first magnification and the second magnification corresponding to each sub-focal length. For example, the preset magnification curve can be drawn directly according to the first magnification and the second magnification corresponding to each sub-focal length. Or, for example, the preset magnification curve can be established according to the first magnification and the second magnification corresponding to each sub-focal length by using a preset data fitting algorithm.

Based on the zoom parameters of the specified pixels value and the zoom scene, the first short zoom lens and the second long zoom lens perform zooming. When both images with the specified pixels value are obtained after zooming, it indicates that when the zoom motors of the lenses in the same application scene move in the overlapping range, the two lenses reach the same focal length. The curve established based on the magnification of each zoom motor of the two lenses at this time can indicate the following relationship of the two lenses. Therefore, a preset zoom tracking curve can be established by recording the magnifications of the zoom motors of the lenses at each sub-focal length and according to the first and second magnifications corresponding to each sub-focal length.

Moreover, based on the above method of establishing a preset magnification curve, after adjusting the magnification of the first short zoom lens and the magnification of the second long zoom lens, if there is a requirement for the output of images captured by the two lenses, for example, a requirement of visualization by images for convenient intuitive analysis, then the first short zoom lens and the second long zoom lens can also be set to perform auto focus, so as to determine the pixels value of the images based on the obtained image pixels, thereby outputting the images.

Figure 6:
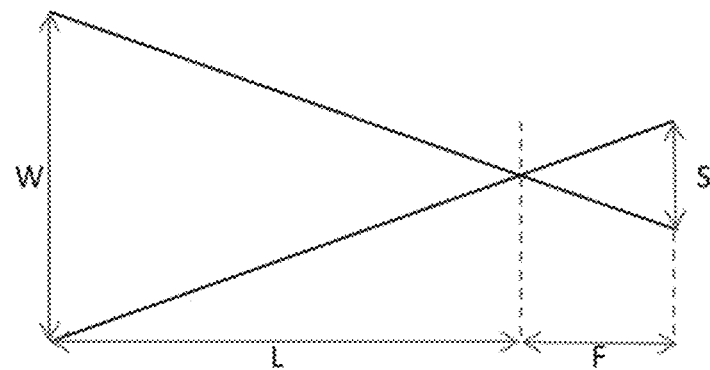
FIG. 6 is a schematic diagram of the imaging principle by lens in the steps of establishing a magnification curve according to an embodiment of the present application.

For ease of understanding, based on the schematic diagram of the principle of imaging by lens in the method for establishing a magnification curve shown in FIG. 6, the method for establishing the above magnification curve is explained. Draw a rectangle of 30 cm*20 cm on a standard target surface drawing as the preset object, place the standard target surface drawing at a distance of 1.5 m directly in front of the lens, and then take the horizontal correction as an example to explain the principle, which is the vertical direction similar to.

As shown in FIG. 6, suppose the width of the object is W=30 cm, the object distance is L=1.5 m, the size of the imaging on the image sensor is S pixels, and the width of each pixel on the image sensor is E, then the preset imaging principle is formula one:

$$\frac{F}{ES} = \frac{L}{W}.$$

The overlapping range [f3,f2] are divided into 10 equally, and are labeled with f30, f31, f32, f33, . . . and f39, where f30=f3, f31=f3+(f2−f3)/10, and so on. When F=f30, the theoretical pixels value S of the long side of the corresponding rectangular image can be calculated using formula one. At this time, adjust the zoom motors of lens A and lens B, and set auto focus so that the pixels on the long side of the rectangular image output by the two lenses are exactly S, record the magnification of lens A and lens B at this time, and draw a point in the focus curve. Repeat the above steps, adjust the zoom motors of lens A and lens B making F=f31, set auto focus, record the magnifications of lens A and lens B at this time, and draw another point in the focus curve.

Perform the above steps 10 times to draw a magnification curve with object distance of 1.5 m. For drawing magnification curves at other object distances, a teleconverter can be used to adjust the object distance to 6 m, and the same operation steps as the above magnification curve with object distance of 1.5 m can be used to draw a magnification curve. with object distance of 6 m. Using the teleconverter to adjust the object distance to 100 m, and the focus curve of INF can be draw by using the same steps as above.

In specific applications, for ease of implementation, when the overlapping range is divided into sub-focal lengths, it is only divided into a limited number, for example, in the above embodiment there are 10 sub-focal lengths, so that a limited number of discrete magnifications are obtained. However, the lens can zoom at any focal length in the overlapping range, and the magnification curve drawn with a limited number of magnifications has the problem that it cannot fully represent the following zoom relationship between the first short zoom lens and the second long zoom lens. In this regard, in order to obtain a more accurate magnification curve fully representing the following zoom relationship between the first short zoom lens and the second long zoom lens, optionally, in the above embodiment, according to the first magnification and the second magnification corresponding to each sub-focal length, The establishment of a preset magnification curve can be established, which specifically include the following steps:

according to the first magnification and the second magnification corresponding to each sub-focal length, performing data fitting on the first magnification and the second magnification corresponding to each sub-focal length by using a preset data fitting method to obtain a preset magnification curve.

Among them, the preset data fitting method can specifically be least square fitting. In addition, similar to the above case of dividing the overlapping range, the actual zooming scene constructed as described above to obtain the magnification curves at multiple preset object distances can only obtain the magnification curves at a limited number of the preset object distances. Therefore, when a magnification curve needs to be captured from the multiple preset magnification curves according to the current object distance, there may be no curve corresponding to the current object distance in the multiple preset magnification curves.

In order to avoid being unable to obtain a first preset magnification curve corresponding to the current object distance from the multiple preset magnification curves, optionally, when the second long zoom lens follows the first short zoom lens to zoom, based on the current object distance and the current magnification corresponding to the first short zoom lens 303, searching for the first preset magnification curve, which can specifically include the following steps:

according to the current object distance, obtaining two preset magnification curves corresponding to the two preset object distances adjacent to the current object distance from the multiple preset magnification curves;

for the specified magnification of the first short zoom lens, according to the two preset magnification curves, respectively determining two specified magnifications of the second long zoom lens corresponding to the specified magnifications of the first short zoom lens;

according to the two specified magnifications and preset ratios of the second long zoom lens, calculating the corresponding magnification of the second long zoom lens corresponding to the specified magnification of the first short zoom lens at the current object distance; and according to the multiple specified magnifications of the first short zoom lens and the corresponding magnifications of the second long zoom lens corresponding to each specified magnification, obtaining a first preset magnification curve by fitting.

Figure 7:
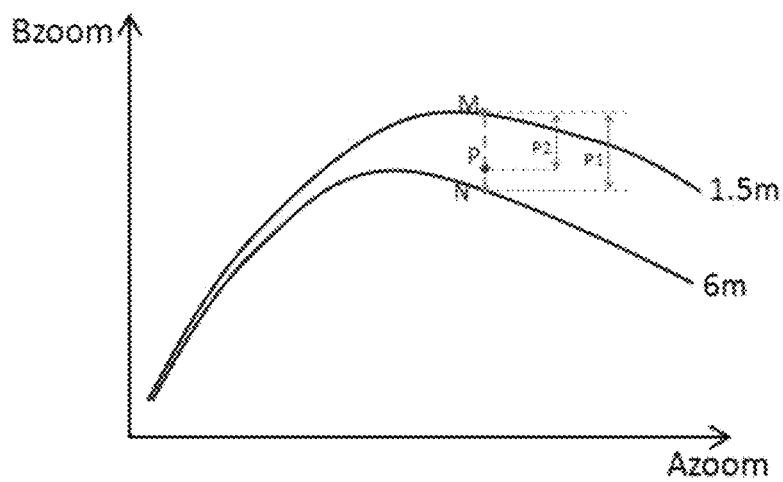
FIG. 7 is a schematic diagram of fitting magnification curves with object distance of 4 m in the steps of establishing a magnification curve according to an embodiment of the present application.

For ease of understanding, description is made by taking the process of fitting a magnification curve with object distance of 4 m shown in FIG. 7 as an example.

For example, when the current object distance is 4 m, the first chip cannot obtain a magnification curve with the object distance of 4 m from the multiple preset magnification curves. Of course, the unavailable here means that there is no magnification curve with object distance of 4 m in the multiple preset magnification curves. The current first short zoom lens is lens A, and the second long zoom lens is lens B. Therefore, the first chip obtains two preset magnification curves corresponding to two object distances of 6 m and 1.5 m that are adjacent to the current object distance of 4 m from the multiple preset magnification curves. For the specified magnification of the first short zoom lens such as P, according to the two preset magnification curves corresponding to 6 m and 1.5 m, the two specified magnifications M and N of the second long zoom lens corresponding to the specified magnifications of the first short zoom lens are determined respectively According to the two specified magnifications M and N of the second long zoom lens, the preset ratio $\beta$, and then the distance between P point and M point: $P2=P1*\beta$, the specified magnification of the secondary lens B corresponding to the specified magnification P of the main lens A at the current object distance is calculated. Suppose the magnification of lens B corresponding to the specified magnification M of lens A is Q, the corresponding magnification of the lens B corresponding to the specified magnification P of the lens A at the current object distance is calculated as $Q-P2=Q-P1*\beta$. Then, according to the multiple specified magnifications of the first short zoom lens and the corresponding magnifications of the second long zoom lens corresponding to each specified magnification, the first preset magnification curve is obtained by fitting.

Of course, the method of obtaining the magnification curve at a new object distance by fitting according to the obtained magnification curves and the preset ratio in the above embodiment can also be used to establish the magnification curve. Specifically, by constructing an actual zoom scene, the magnifications curve at at least two object distances can be obtained. According to the at least two obtained magnification curves, the above fitting method is adopted to obtain the magnification curves at multiple object distances. The fitting method does not need time for multiple object distance adjustments, which is beneficial to improve the efficiency of establishing the magnification curve.

Considering that during the zooming process of the image capture device, if the second long zoom lens only performs zoom tracking when following the movement of the first short zoom lens, and the focus lens of the second long zoom lens will start focusing when the lens is switched, there will be a problem that the picture is suddenly blurred. In order to avoid image blur during lens switching, optionally, after the second long zoom lens is zoomed based on the current magnification of the second long zoom lens, the image capture method provided in the embodiment of the present application can further include the following steps:

step 1: capturing the current focus curve of the second long zoom lens, and the current focus curve is a curve generated according to the corresponding relationship between the magnification and the focal length of the second long zoom lens at the current object distance of the scene where the image capture device is located.

wherein, the focus curve can be specifically as shown in FIG. 4(a) and FIG. 4(b) of this application. A_focus and B_focus represent the focal lengths of lens A and lens B respectively. A_zoom and B_zoom represent the magnifications of lens A and lens B respectively. The object distances corresponding to each curve are 1.5 m, 6 m and INF.

step 2: determining the current focal length of the second long zoom lens according to the current object distance and the current focus curve of the second long zoom lens.

During the movement of the zoom motor, the focus motor also follows to move. Among them, the focus motor of lens A follows the curve in FIG. 4(a), and the focus motor of lens B follows the curve in FIG. 4(b).

step 3: performing focusing operation on the second long zoom lens based on the current focal length of the second long zoom lens.

For example, suppose lens A is the first short zoom lens, and lens B is the second long zoom lens. The first chip determines the current focus curve of lens A from the focus curve shown in FIG. 4(a) according to the current magnification of the zoom motor and the current focal length of the focus motor of lens A, such as the curve corresponding to the object distance of 1.5 m. According to the current focus curve, the current object distance of the scene where the image capture device is located is determined as 1.5 m. According to the current object distance of 1.5 m, from the multiple focus curves shown in FIG. 4(b), the focus curve with an object distance of 1.5 m is obtained, so as to determine the current magnification of lens B. Based on the current magnification of the second long zoom lens, the second long zoom lens is performed focusing on. Suppose the first short zoom lens is lens B and the second long zoom lens is lens A, the operation is similar to the operation performed when the first short zoom lens is lens A, and the difference is that when the second long zoom lens follows to focus, the focus curve based on is the focus curve of lens A.

In addition, for the case where the image capture device contains more than two zoom lenses, since the zooming is always performed within the expanded zoom range, no matter which lens zoom range the current focal length belongs to, as long as the overlapping range of the current focal length is determined, the two adjacent zoom ranges within the overlapping range can be determined, so that the two lenses corresponding to the two adjacent zoom ranges can be determined, and then the same steps as those for two lenses can be performed to achieve image captures after the expansion of focal length range by using more than two zoom lenses.

In specific applications, when the focal length of the image capture device is expanded through the above embodiment of the present application shown in FIG. 1, it is likely that the optical axis is not on the same straight line because the two lenses or multiple lenses are placed side by side during the assembly process. For example, when two lenses are placed left and right, one angle of view is to the left and the other angle of view is to the right. At this time, when the output screen pictures of the image capture device is switched from the image captured by one lens to the image captured by another lens, an abnormal screen picture jumps occur. In this regard, in order to reduce abnormal screen picture jumps when switching the output screen pictures of different lenses, yet another embodiment of the present application provides an image capture device with at least two zoom lenses, which includes: a first chip and at least two zoom lenses; the at least two zoom lenses include a first short zoom lens and a second long zoom lens, wherein the first short zoom lens has a first continuous zoom interval, and the second long zoom lens has a second continuous zoom interval, and the first continuous zoom interval and the second continuous zoom interval have a continuous partially-overlapping interval.

The above first chip is further configured for:

before controlling the image sensor corresponding to the second long zoom lens to generate real-time images and controlling the image sensor corresponding to the first short zoom lens to stop generating real-time images, when the current magnification corresponding to the images output by the image capture device is within the continuous overlapping interval, obtaining a reference image captured by the first short zoom lens at the current magnification; performing feature identification on the reference image to obtain the length and height of a feature in the reference image and the positions of the feature points in the reference image;

obtaining a first image captured by the second long zoom lens at the current magnification; performing feature identification on the first image to obtain the length and height of the feature in the first image and the positions of the feature points in the first image;

at the current magnification, when the image output by the image capture device is switched from the image captured by the first short zoom lens to the image captured by the second long zoom lens, according to the length and height of the feature and positions of the feature points in the reference image and the length and height of the feature and positions of the feature points in the first image, determining an area to be output of the first image; and outputting the area to be output of the first image according to the output resolution of the image capture device.

Figure 8:
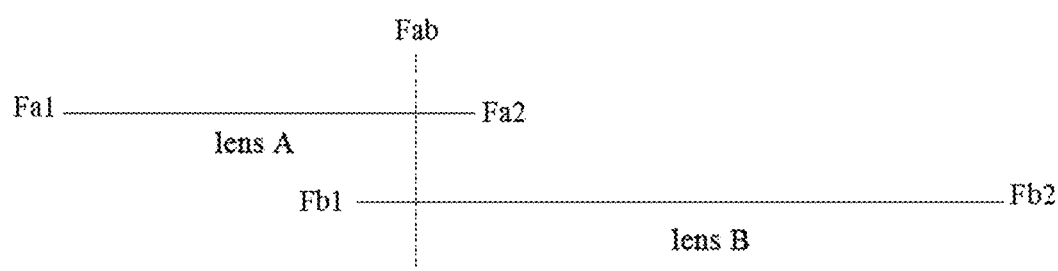
FIG. 8 shows the equivalent focal lengths of two zoom lenses according to yet another embodiment of the present application.

Among them, the first short zoom and the second long zoom in the first short zoom lens and the second long zoom lens are only for facilitating the description of the two zoom lenses. For example, as shown in FIG. 8, lens A can be supposed as the first short zoom lens and lens B as the second long zoom lens; of course, lens B can be supposed as the first short zoom lens and lens A as the second long zoom lens. Since the image capture device includes two zoom lenses and the parameters of the optical elements of each lens are different, in order to facilitate calculation and description, in this application, the focal length of each lens is the focal length with the same parameters, that is, the equivalent focal length. For example, the focal length is converted into the lens focal length corresponding to the same imaging angle of view on the 135 camera (a camera specification), and the converted focal length is the equivalent focal length. For example, when the image capture device includes two zoom lenses: lens A and lens B, the equivalent focal lengths of the lens A and lens B can be as shown in FIG. 8, where the equivalent focal lengths of lens A are Fa1–Fa2, the equivalent focal length of lens B is Fb1–Fb2, and the overlapping range of the equivalent focal length of lens A and lens B is [Fb1,Fa2].

In addition, the image capture device uses computer vision technologies, such as a convolutional neural network, to determine feature points and feature included in the first image and the reference image. In order to further reduce the degree of screen picture jumps, when selecting the feature points, a more obvious point near the center of the screen can be selected as a feature point. The length and height of the feature should be as large as possible, but the feature must be completely included in the first image and the reference image. The image capture device determines the coordinates of the feature points in the two-dimensional coordinate system of the reference image to obtain the reference coordinates. And according to the two-dimensional coordinate system of the reference image, determine the length of the feature in the reference image: reference length, and height: reference height.

In specific applications, the image capture device aligns the first image with the reference image according to the reference coordinates, reference length, reference height, first coordinates, first length, and first height and using the reference image as the reference to determine the area to be output of the first image. When the image currently output by the image capture device is an image captured by the second long zoom lens, the image capture device outputs the area to be output of the first image according to the output resolution. In this way, when the image output by the image capture device is converted into the image captured by the first short zoom lens, the degree of screen pictures jumps are small. Or when the image currently output by the image capture device is the image captured by the first short zoom lens, at the time that the image output by the image capture device is converted into the image captured by the second long zoom lens, the image capture device outputs the area to be output of the first image, thereby reducing the degree of screen picture jumps.

The image capture device of the embodiment of the present application, for the image capture device with two or more zoom lenses, determines an area to be output of the reference image according to the reference coordinates, reference length, reference height, first coordinate, first length, and first height when applying magnification splicing, which reduces the degree of screen picture jumps.

Optionally, the first chip obtains a first image captured by the second long zoom lens at a first focal length and a reference image captured by the first short zoom lens at the first focal length can specifically include:

step 1: obtaining a first image captured by the second long zoom lens at the first focal length.

step 2: determining a second focal length of the first short zoom lens according to the first focal length, wherein the equivalent focal length of the first focal length is the same as that of the second focal length.

Wherein, according to the optical parameters of the second long zoom lens and the first short zoom lens, the first focal length can be converted into the focal length of the first short zoom lens to obtain the second focal length of the first short zoom lens.

step 3: setting the focal length of the first short zoom lens as the second focal length, and obtaining a reference image captured by the first short zoom lens at the second focal length.

wherein, the reference image and the first image can be as shown in FIG. 9(*a*) and FIG. 9(*b*), the width of the image output by the image capture device is Fw, and the height of the image output by the image capture device is Fh.

Optionally, according to the length and height of the feature and the positions of the feature points in the reference image, as well as the length and height of the feature and the positions of the feature points, determining the area to be output of the first image includes the following steps 1 to 4:

step 1: obtaining an output area of the reference image, wherein the feature is included in the output area of the reference image, and the feature points are included in the output area of the reference image;

step 2: calculating the ratio of the length of the feature in the reference image to the length of the feature in the first image and the ratio of the height of the feature in the reference image to the height of the feature in the first image to obtain a target scaling ratio;

step 3: according to the target scaling ratio, scaling the output area of the reference image to obtain a scaled image; and step 4: by using the feature points in the scaled image and the feature points in the first image as the aligned reference points, determining a mapping area in the first image corresponding to the scaled image as the area to be output of the first image.

Figure 9A:
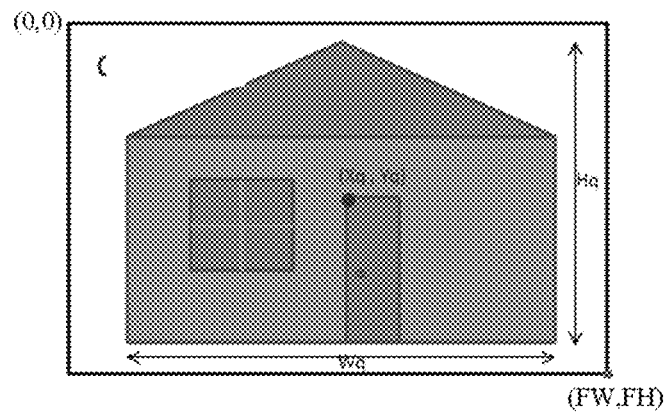
FIG. 9($a$) shows a reference image according to yet another embodiment of the present application.
FIG. 9(b) shows a first image corresponding to the reference image of FIG. 9(a) according to yet another embodiment of the present application.
Figure 9B:
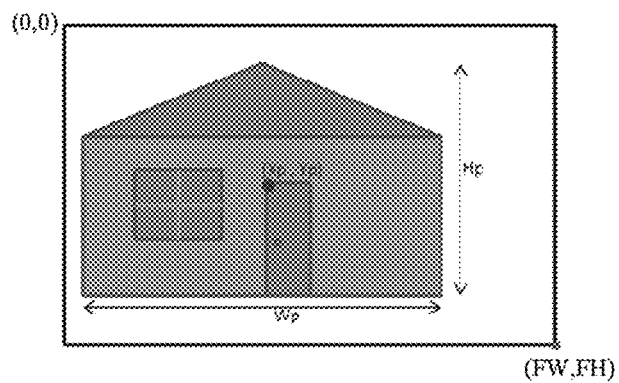

Optionally, according to the length and height of the feature and the positions of the feature points in the reference image, as well as the length and height of the feature and the positions of the feature points, determining the area to be output of the first image includes the following steps 1 to 5:

step 1: according to the coordinates of the feature points in the first image, the coordinates of the feature points in the reference image, the length of the feature in the first image, and the length of the feature in the reference image, based on formula (1):

$$\text{Left} = X_p - \frac{W_p * X_q}{W_q},$$

determining the cropping length on the left; wherein, Left is the cropping length on the left, $X_p$ is the X coordinate of the feature points in the first image, $W_p$ is the length of the feature in the first image, $X_q$ is the X coordinate of the feature points in the reference image, and $W_q$ is the length of the feature in the reference image;

step 2: according to the coordinates of the feature points in the first image, the coordinates of the feature points in the reference image, the length of the feature in the first image, and the length of the feature in the reference image, based on formula (2):

$$\text{Right} = F_w + \frac{W_p * X_q}{W_q} - X_p - \frac{W_p * F_w}{W_q},$$

determining the cropping length on the right, where Right is the above cropping length on the right, and Fw is the width of the output resolution of the above image capture device;

step 3: according to the coordinates of the feature points in the first image, the coordinates of the feature points in the reference image, the height of the feature in the first image, and the height of the feature in the reference image, based on formula (3):

$$\text{Up} = Y_p - \frac{H_p * Y_q}{H_q},$$

determining the cropping length on the up side, wherein, Up is the cropping length on the up side, Yp is the Y coordinate of the feature points in the first image, Hp is the height of the feature in the first image, Yq is Y coordinate of the feature points in the reference image, and Hq is the height of the feature in the reference image;

step 4: according to the coordinates of the feature points in the first image, the coordinates of the feature points in the reference image, the height of the feature in the first image, and the height of the feature in the reference image, based on formula (4):

$$\text{Down} = F_h + \frac{H_p * Y_q}{H_q} - Y_p - \frac{H_p * F_h}{H_q},$$

determining the cropping length on the down side, wherein, Down is the above cropping length on the down side, Fh is the height of the output resolution of the above image capture device; and step 5: according to the cropping length on the left side, the cropping length on the right side, the cropping length on the up side and the cropping length on the down side, cropping the reference image to obtain the area to be output of the reference image.

wherein, a schematic diagram of the reference image can be as shown in FIG. 9(a), and a schematic diagram of the first image can be as shown in FIG. 9(b).

Optionally, the first chip is further configured for:

when the current magnification of the second long zoom lens is not in the overlapped continuous interval, obtaining a target cropping length on the left side, a target cropping length on the right side, an target cropping length on the up side, and a target cropping length on the down side at a magnification extreme value, wherein the magnification extreme value is an extreme value of the overlapped continuous interval;

cropping the image captured by the second long zoom lens according to the target cropping length on the left side, the target cropping length on the right side, the target cropping length on the up side, and the target cropping length on the down side, to obtain a target area to be output of the image captured by the second long zoom lens; and outputting the target area to be output of the image captured by the second long zoom lens according to the output resolution of the image capture device.

Optionally, the first chip is further configured for:

when the current magnification of the second long zoom lens is not in the overlapped continuous interval, obtaining a second image captured by the second long zoom lens at the current magnification and a third image captured by the first short zoom lens at a magnification extreme value, wherein the magnification extreme value is an extreme value of the overlapped continuous interval, and the magnification extreme value is a magnification extreme value of the first short zoom lens;

performing feature identification on the second image to obtain a length and height of the feature object in the second image and coordinates of the feature points in the second image; performing feature identification on the third image to obtain a length and height of the feature object in the third image and coordinates of the feature points in the third image;

calculating a target cropping length on the left side, a target cropping length on the right side, a target cropping length on the up side and a target cropping length on the down side according to the length and height of the feature object and positions of the feature points in the second image, and the length and height of the feature object and positions of the feature points in the third image;

according to the target cropping length on the left side, the target cropping length on the right side, the target cropping length on the up side, the target cropping length on the down side, and a unit adjustment magnification of the second long zoom lens, calculating unit lengths to be cropped respectively on the left side, right side, up side, and down side when adjusting a unit adjustment magnification each time from the magnification extreme value to the current magnification;

determining the target area to be output of the image captured by the second long zoom lens according to unit lengths to be cropped respectively on the left side, right side, up side, and down side; and outputting the target area to be output of the image captured by the second long zoom lens according to the output resolution of the image capture device.

The magnification extreme value is an extreme value in the overlapping range, and is not an extreme value of the second long zoom lens. For example, as shown in FIG. 8, when the second long zoom lens is lens A and the first short zoom lens is lens B, the magnification extreme value is Fb1; when the second long zoom lens is lens B, the first short zoom lens is lens A, the magnification extreme value is Fa2. For the calculation methods for the target cropping length on the left side, the target cropping length on the right side, the target cropping length on the up side and the target cropping length on the down side, please refer to the above formula (1)-(4), which will not be repeated here.

In addition, the unit adjusting focal length of the second long zoom lens can be determined according to the minimum adjusting unit of the Zoom motor of the second long zoom lens in the image capture device. The following takes the calculation of the unit length on the left side as an example. Adjusting the focal length of the second long zoom lens from the current magnification to the magnification extreme value requires a total of N unit adjusting focal length, so that the unit length on the left side=the target cropping length on the left side/N. The calculation methods for the unit length on the right side, the unit length on the up side, and the unit length on the down side are similar to the above, which will be not repeated here.

For example, in the process of adjusting magnification from the current magnification to the magnification extreme value, a total of M units are adjusted from the current magnification, so that it is necessary to crop M unit length with regard to the left side on the left side of the image currently captured by the second long zoom lens, crop M unit lengths with regard to the right side on the right side, crop M unit lengths with regard to the up side on the up side, and crop M unit lengths with regard to the down side on the down side to obtain a target area to be output.

Optionally, the above first chip is further configured for:

by using computer vision technologies, identifying the feature and the feature points are commonly included in the reference image and the first image.

Figure 10:
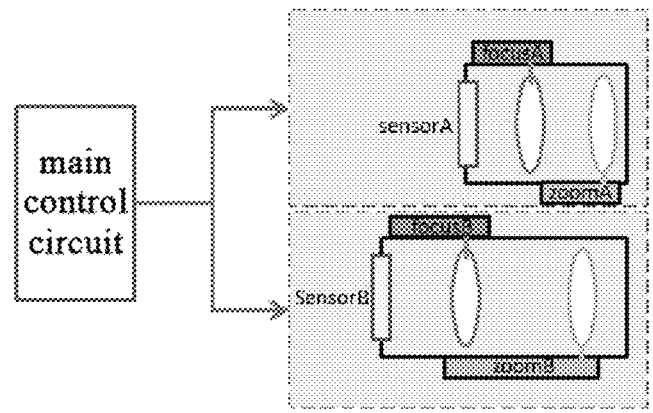
FIG. 10 shows a schematic diagram of the hardware of an image capture device according to yet another embodiment of the present application.

Optionally, an image capture device including two zoom lenses can be as shown in FIG. 10, wherein, Sensor is an image sensor, focus is a Focus motor, and zoom is a Zoom motor.

Optionally, the first chip is a processor, and the above image capture device further includes a storage medium, a communication interface, and a communication bus. The processor, the communication interface, and the memory communicate with each other through the communication bus.

The above communication bus mentioned in the image capture device can be a Peripheral Component Interconnect (PCI) bus or an Extended Industry Standard Architecture (EISA) bus, etc. The communication bus can be divided into address bus, data bus, control bus, etc. For ease of representation, only one thick line is used to present in the figure, but it does not mean that there is only one bus or one type of bus.

The communication interface is used for the communication between the above image capture device and other device.

All of the embodiments in the description are described in a correlated manner, and identical or similar parts in various embodiments can refer to one another. In addition, the description for each embodiment focuses on the differences from other embodiments.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or device, including a series of elements, include not only those elements that have been listed, but also other elements that have not specifically been listed or the elements intrinsic to these processes, methods, articles, or device. Without further limitations, elements limited by the wording "comprise(s) a/an . . . " do not exclude additional identical elements in the processes, methods, articles, or device, including the listed elements.

The descriptions mentioned-above are only preferred embodiments of the present application, and are not intended to limit the scope of the present application. Any modification, equivalent, or improvement within the spirit and principle of this application are included within the scope of this application.

The invention claimed is:

1. An image capture device, comprising:
a first chip, zoom lenses, image sensors, zoom motors, and focus motors;
wherein a number of the first chip is one;
a number of the zoom lenses is two, which comprises a first short zoom lens and a second long zoom lens; the two zoom lenses have different zoom ranges, and there is an overlap range between the different zoom ranges of the two zoom lenses;
a number of the image sensors is two, and the two image sensors correspond to the two zoom lenses respectively, and the two image sensors are communicatively connected to the first chip respectively;
a number of the zoom motors is two, a number of the focus motors is two, and the two zoom motors and the two focus motors are communicatively connected to the first chip respectively; wherein one of the two zoom motors is connected to the first short zoom lens, and the other one of the two zoom motors is connected to the second long zoom lens; and one of the two focus motors is connected to the first short zoom lens, and the other one of the two focus motors is connected to the second long zoom lens; and
the first chip is configured for, upon detecting that a current focal length of the first short zoom lens is equal to a preset switching focal length value, controlling an image sensor corresponding to the second long zoom lens to generate real-time images, and controlling an image sensor corresponding to the first short zoom lens to stop generating the real-time images; wherein the preset switching focal length value is within the overlap range;
wherein the first chip is further configured for:

before controlling the image sensor corresponding to the second long zoom lens to generate the real-time images and controlling the image sensor corresponding to the first short zoom lens to stop generating the real-time images, determining a preset magnification corresponding to the first short zoom lens based on the preset switching focal length;

based on the preset magnification corresponding to the first short zoom lens, a specified zoom speed and an initial magnification of the first short zoom lens, determining an initial step size of the zoom motor of the first short zoom lens, and controlling the zoom motor of the first short zoom lens to operate to the initial step size; and after the zoom motor of the first short zoom lens operates to the initial step size, controlling the zoom motor of the first short zoom lens to perform a zoom operation according to the specified zoom speed.

2. The image capture device according to claim 1, wherein the detecting that a current focal length of the first short zoom lens is equal to the preset switching focal length value comprises:

obtaining a current magnification of the zoom motor corresponding to the first short zoom lens; according to the current magnification, determining the current focal length of the first short zoom lens by using a preset corresponding relationship between a magnification and a focal length; determining whether the current focal length of the short zoom lens is equal to the preset switching focal length value; if yes, detecting that the current focal length of the first short zoom lens is equal to the preset switching focal length value.

3. The image capture device according to claim 1, wherein the image capture device further comprises a second chip, wherein a number of the second chip is one, and the first chip is communicatively connected to the second chip;

the two zoom motors and the two focus motors are respectively communicatively connected to the first chip via the second chip;

the first chip is further configured for, upon detecting the current focal length of the first short zoom lens is equal to the preset switching focal length, before controlling an image sensor corresponding to the second long zoom lens to generate real-time images, sending a control instruction to the second chip; and the second chip is configured for, upon receiving the control instruction, controlling the zoom motor corresponding to the second long zoom lens to perform a zoom operation, controlling the focus motor corresponding to the second long zoom lens to perform focusing operation, and controlling the image sensor corresponding to the second long zoom lens not to generate the real-time images.

4. The image capture device according to claim 3, wherein the first chip, upon detecting that the current focal length of the first short zoom lens is within the overlap range, sending the control instruction to the second chip comprises:

upon detecting that the current focal length of the first short zoom lens is within the overlap range, obtaining a current object distance corresponding to the current focal length, and determining a first magnification and a first focal length of the second long zoom lens based on the current object distance and the current focal length, and sending the control instruction including the first magnification and the first focal length to the second chip; and the second chip, upon receiving the control instruction, controlling the zoom motor corresponding to the second long zoom lens to perform the zoom operation, controlling the focus motor corresponding to the second long zoom lens to perform the focusing operation, and controlling the image sensor corresponding to the second long zoom lens not to generate the real-time images comprises:

upon receiving the control instruction including the first magnification and the first focal length, controlling the zoom motor corresponding to the second long zoom lens to perform the zoom operation according to the first magnification, controlling the focus motor corresponding to the second long zoom lens to performs the focusing operation according to the first focal length, and controlling the image sensor corresponding to the second long zoom lens not to generate the real-time images.

5. The image capture device according to claim 4, wherein the obtaining the current object distance corresponding to the current focal length and determining the first magnification and the first focal length of the second long zoom lens based on the current object distance and the current focal length comprises:

determining the current object distance based on the current magnification and the current focal length corresponding to the first short zoom lens;

based on the current object distance and the current magnification corresponding to the first short zoom lens, searching for a first preset magnification curve and determining a first magnification corresponding to the second long zoom lens; wherein the first preset curve comprises at least one magnification curve, any one of the at least one magnification curve is used to indicate a corresponding relationship between magnification of the first short zoom lens and magnification of the second long zoom lens at one preset object distance, and wherein different magnification curves correspond to different preset object distances; and based on the first magnification corresponding to the second long zoom lens, searching for a focus curve corresponding to the second long zoom lens and determining a first focal length corresponding to the second long zoom lens, wherein the focus curve comprises at least one focus curve, any one of the at least one focus curve is used to indicate a corresponding relationship between magnification of the second long zoom lens and focal length of the second long zoom lens at one preset object distance, and wherein different focus curves correspond to different preset object distances.

6. The image capture device according to claim 1, wherein the first chip is further configured for:

upon detecting that the focal length of the second long zoom lens is equal to the preset switching focal length value, instructing the image sensor corresponding to the first short zoom lens to generate real-time images, and instructing the image sensor corresponding to the second long zoom lens to stop generating the real-time images.

7. The image capture device according to claim 1, wherein the first chip is further configured for:

upon detecting that the current focal length of the first short zoom lens is not within the overlap range and is within the zoom range of the first short zoom lens, controlling the image sensor corresponding to the first short zoom lens to generate the real-time images, and controlling the image sensor corresponding to the second long zoom lens not to generate the real-time images.

8. The image capture device according to claim 1, wherein the first short zoom lens has a first continuous zoom interval, the second long zoom lens has a second continuous zoom interval, and the first continuous zoom interval and the second continuous zoom interval have a partially overlapped continuous interval;

the first chip is further configured for:
before controlling the image sensor corresponding to the second long zoom lens to generate the real-time images and controlling the image sensor corresponding to the first short zoom lens to stop generating the real-time images, when a current magnification corresponding to images output by the image capture device is within the partially overlapped continuous interval, obtaining a reference image captured by the first short zoom lens at the current magnification; performing feature identification on the reference image to obtain length and height of a feature object in the reference image and positions of feature points in the reference image;
obtaining a first image captured by the second long zoom lens at the current magnification; performing feature identification on the first image to obtain length and height of a feature object in the first image and positions of feature points in the first image;
at the current magnification, when images output by the image capture device is switched from images captured by the first short zoom lens to images captured by the second long zoom lens, determining an area to be output of the first image according to the length and height of the feature object and positions of the feature points in the reference image and the length and height of the feature object and positions of the feature points in the first image; and
outputting the area to be output of the first image according to an output resolution of the image capture device.

9. The image capture device according to claim 8, wherein determining the area to be output of the first image according to the length and height of the feature object and positions of the feature points in the reference image and the length and height of the feature object and positions of the feature points in the first image comprises:
obtaining an output area of the reference image, wherein the feature object is included in the output area of the reference image, and the feature points are included in the output area of the reference image; calculating a ratio of the length of the feature object in the reference image to the length of the feature object in the first image, and a ratio of the height of the feature object in the reference image to the height of the feature object in the first image to obtain a target scaling ratio; and
scaling the output area of the reference image according to the target scaling ratio to obtain a scaled image; by using feature points in the scaled image and the feature points in the first image as aligned reference points, determining a mapping area in the first image corresponding to the scaled image as the area to be output of the first image.

10. The image capture device according to claim 9, wherein the first chip is further configured for:

when the current magnification of the second long zoom lens is not in the partially overlapped continuous interval, obtaining a target cropping length on the left side, a target cropping length on the right side, a target cropping length on the up side, and a target cropping length on the down side at a magnification extreme value, wherein the magnification extreme value is an extreme value of the partially overlapped continuous interval;
cropping the image captured by the second long zoom lens according to the target cropping length on the left side, the target cropping length on the right side, the target cropping length on the up side, and the target cropping length on the down side, to obtain a target area to be output of the image captured by the second long zoom lens; and
outputting the target area to be output of the image captured by the second long zoom lens according to the output resolution of the image capture device.

11. The image capture device according to claim 8, wherein the first chip is further configured for:
when the current magnification of the second long zoom lens is not in the partially overlapped continuous interval, obtaining a second image captured by the second long zoom lens at the current magnification and a third image captured by the first short zoom lens at a magnification extreme value, wherein the magnification extreme value is an extreme value of the partially overlapped continuous interval, and the magnification extreme value is a magnification extreme value of the first short zoom lens;
performing feature identification on the second image to obtain a length and height of the feature object in the second image and coordinates of the feature points in the second image; performing feature identification on the third image to obtain a length and height of the feature object in the third image and coordinates of the feature points in the third image;
calculating a target cropping length on the left side, a target cropping length on the right side, a target cropping length on the up side and a target cropping length on the down side according to the length and height of the feature object and positions of the feature points in the second image, and the length and height of the feature object and positions of the feature points in the third image;
according to the target cropping length on the left side, the target cropping length on the right side, the target cropping length on the up side, the target cropping length on the down side, and a unit adjustment magnification of the second long zoom lens, calculating unit lengths to be cropped respectively on the left side, right side, up side, and down side when adjusting the unit adjustment magnification each time from the magnification extreme value to the current magnification;
determining the target area to be output of the image captured by the second long zoom lens according to the unit lengths to be cropped respectively on the left side, right side, up side, and down side; and
outputting the target area to be output of the image captured by the second long zoom lens according to the output resolution of the image capture device.

* * * * *